United States Patent [19]
Klein

[11] Patent Number: 5,657,482
[45] Date of Patent: Aug. 12, 1997

[54] AUTOMATIC CLOCK SPEED SENSING SYSTEM FOR DETERMINING THE NUMBER OF STATES NEEDED FOR A TIME-DEPENDENT OPERATION BY SENSING CLOCK FREQUENCY

[75] Inventor: Dean A. Klein, Lake City, Minn.

[73] Assignee: Micron Electronics, Inc., Nampa, Id.

[21] Appl. No.: 641,705

[22] Filed: May 2, 1996

Related U.S. Application Data

[63] Continuation of Ser. No. 111,178, Aug. 24, 1993, abandoned.

[51] Int. Cl.$^6$ .................................................. G06F 13/10
[52] U.S. Cl. .................... 395/558; 395/849; 395/427; 395/500
[58] Field of Search ........................ 395/500, 550, 395/427, 849, 555, 558

[56] References Cited

U.S. PATENT DOCUMENTS

| | | | |
|---|---|---|---|
| 4,215,400 | 7/1980 | Denko | 395/404 |
| 4,365,293 | 12/1982 | Holtz | 364/464.02 |
| 4,379,327 | 4/1983 | Tietjen et al. | 364/200 |
| 4,586,175 | 4/1986 | Bedard et al. | 370/449 |
| 4,607,346 | 8/1986 | Hill | 395/497.01 |
| 4,615,017 | 9/1986 | Finlay et al. | 364/900 |
| 4,665,518 | 5/1987 | Champlin et al. | 370/222 |
| 4,667,191 | 5/1987 | Comroe et al. | 340/825.5 |
| 4,807,109 | 2/1989 | Farrell et al. | 364/200 |
| 4,845,437 | 7/1989 | Mansur et al. | 328/15 |
| 4,891,768 | 1/1990 | Willems et al. | 395/520 |
| 4,912,633 | 3/1990 | Schweizer et al. | 395/800 |
| 4,972,432 | 11/1990 | Wilson et al. | 395/220 |
| 5,029,124 | 7/1991 | Leahy et al. | 395/285 |
| 5,150,359 | 9/1992 | Wilson et al. | 370/438 |
| 5,199,106 | 3/1993 | Bourke et al. | 395/290 |
| 5,210,858 | 5/1993 | Jensen et al. | 395/550 |
| 5,263,172 | 11/1993 | Olnowich | 395/800 |
| 5,341,495 | 8/1994 | Joyce et al. | 395/500 |
| 5,371,880 | 12/1994 | Bhattacharyo | 395/550 |
| 5,412,795 | 5/1995 | Larson | 395/500 |
| 5,448,715 | 9/1995 | Lelm et al. | 395/550 |
| 5,459,855 | 10/1995 | Lelm | 395/550 |

*Primary Examiner*—Alvin P. Oberley
*Assistant Examiner*—Michael T. Richey
*Attorney, Agent, or Firm*—Dorsey & Whitney LLP

[57] ABSTRACT

An interface between a peripheral device and bus in a synchronous system that is capable of operating at a plurality of clock frequencies. The interface optimizes the number of states used in a time-dependent peripheral device operation by considering the length of the time interval between clock cycles for the clock frequency at which the system is operating.

13 Claims, 5 Drawing Sheets

AUTOMATIC CLOCK SPEED SENSING SYSTEM FOR DETERMINING THE NUMBER OF STATES NEEDED FOR A TIME-DEPENDENT OPERATION BY SENSING CLOCK FREQUENCY

This is a continuation of application Ser. No. 08/111,178 filed Aug. 24, 1993, now abandoned.

TECHNICAL FIELD

This invention relates to data processing systems in which a central processing unit (CPU) performs input/output (I/O) operations and memory access operations using a communication bus. More particularly, this invention relates to apparatus and methods for sensing a selected clock speed in a CPU and adjusting the circuitry used to communicate signals for input/output (I/O) operations and memory access operations so that changes in clock speed can be accommodated without disruption or significant loss in efficiency of input/output (I/O) operations and memory access operations.

BACKGROUND ART

A computing system may be built to accommodate a variety of CPU speeds. Changes in CPU speed may result simply from the availability of CPU's that can be driven at higher clock speeds. Changes in CPU speed can also occur when a system has a power-saving mode that involves decreasing clock speed or when a user has an upgradable system and installs a faster CPU. In such cases, the system designer may have designed portions of the system to deal with the higher clock speed, but the timing requirements for at least some peripheral devices and for memory may remain the same. In an extreme case, the new timing relationship of CPU and peripheral device or memory results in incompatibility. More often, the change in speed causes a less than optimum relationship between the CPU and peripheral devices or memory.

In many systems the CPU speed is configured by selection of a switch or jumper (or a combination of switches and jumpers). The outputs of these switches are typically applied to the input of a frequency synthesizer, which in turn generates the desired CPU clock frequency signal based on the state of its inputs. It is possible to program a CPU to sense its own dock speed, but this procedure differs for CPUs from different manufacturers and often proves to be inaccurate. Even if the CPU were able to sense its own clock speed, there remains the issue of what steps the CPU could take to utilize the information to adjust the timing of its communications with peripheral devices or memory. Such adjustment may necessitate replacing the state machines controlling those devices.

What is needed is a method for adapting a system to accommodate changes in CPU speeds, to reduce disruptions in communications between the CPU and peripheral devices or memory.

SUMMARY OF THE INVENTION

An apparatus for controlling a speed dependent device operatively connected to a CPU is claimed, wherein the CPU is capable of operating at a plurality of clock speeds, including a first dock speed with a first interval between clock signals, and a second clock speed with a second interval between dock signals. The first clock speed is faster than the second clock speed and consequently the first interval is shorter than the second interval. A clock generation means generates a clock with a clock speed and a clock interval at which the CPU operates. The clock speed and clock interval at which the CPU operates is determined by inputs to this clock generation means.

The apparatus comprises: identification means for identifying the inputs to the dock generation means; a clock input corresponding to the clock generated by the clock generation means; a device output operably connected to the speed dependent device for providing signals to the speed dependent device at signal intervals; and logic means responsive to the identification means so that the signal interval consists of at least two consecutive clock intervals when the clock speed is the first dock speed, and so that the signal interval is reduced by at least one clock interval when the dock speed is the second clock speed.

An object of the present invention is to provide a method and apparatus for accommodating changes in the CPU clock speed so that communications with time-dependent peripheral devices and memory devices are not disrupted.

A further object of the present invention is to permit a communications bus to operate at different clock speeds so that a change to a slower CPU clock speed does not cause an unnecessary slow-down in the speed of I/O or memory access operations.

DETAILED DESCRIPTION OF THE PREFERRED EMBODIMENT

Figure 1:
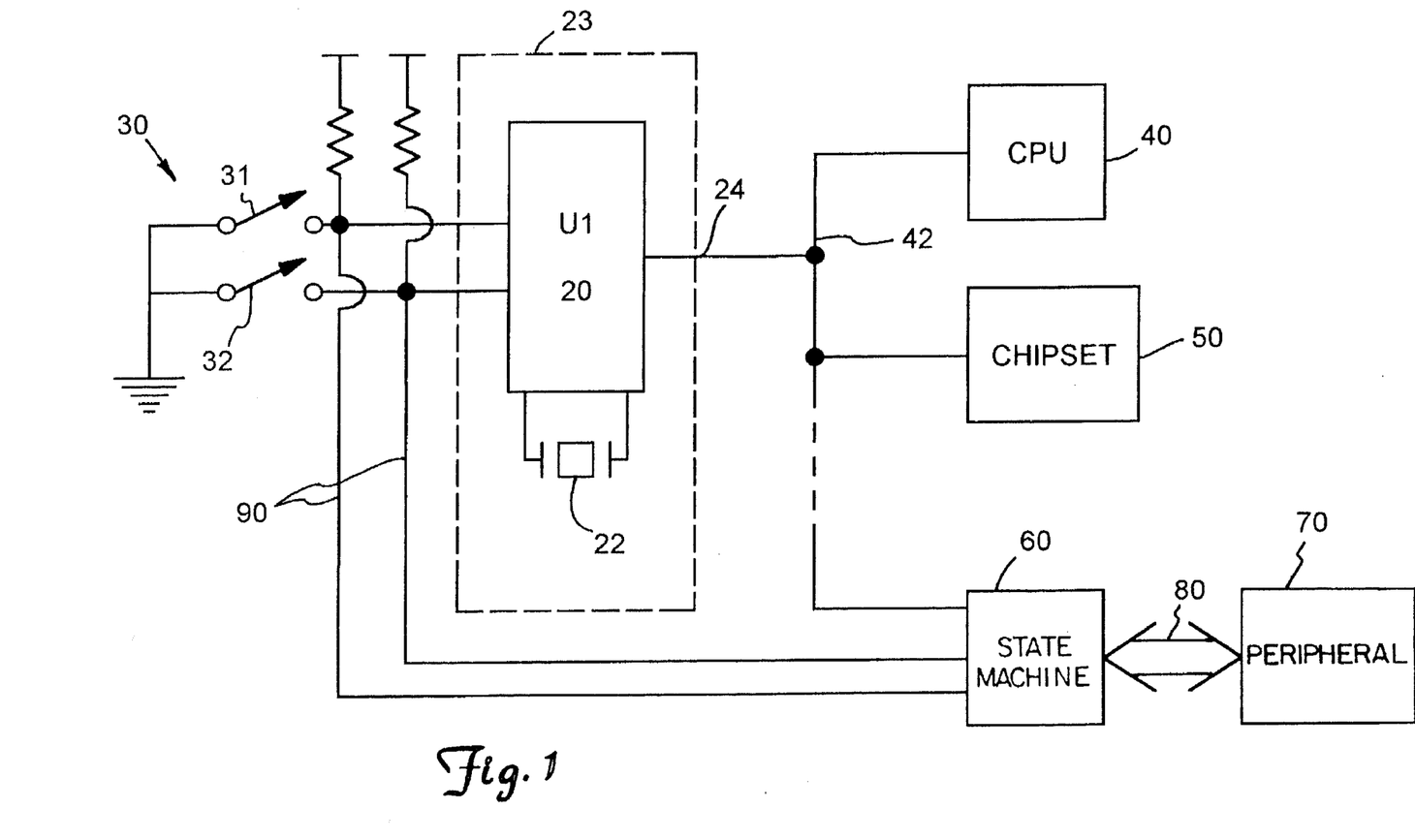
FIG. 1 is a schematic diagram of the present invention as incorporated in a typical personal computer architecture.

FIG. 1 shows the overall architecture of a typical personal computer system 10 in which the present invention has been implemented. A CPU 40 is connected to a synchronous bus 42. Also connected to the bus 42 is a chipset 50 that contains the logic for converting communications on the synchronous bus 42 to asynchronous signals for control of and communication with peripherals, such as hard disk drives.

A clock synthesizer chip 20 (such as an AV 9107, manufactured by Avasem Corporation of San Jose, Calif.) using an external crystal 22 generates a clock signal to drive the CPU 40 and other system components. The clock synthesizer chip and the crystal 22 serve as the clock generation means 23 in FIG. 1. The frequency synthesizer for a typical 80486 series CPU uses a 14.318 MHz crystal and an internal phase locked loop (PLL) to generate a CPU clock signal much higher in frequency than the 14.318 MHz signal. To accommodate CPUs that may be driven at different clock speeds, the clock synthesizer chip 20 has inputs 30 to the clock generation means. These inputs can be, for example, hard or soft switches 31, 32. The inputs to the clock generation means 23 may be set by a user through the use of jumpers or switches, or under program control through alteration of CMOS configuration memory. The two switches 31, 32 shown in FIG. 1 permit selection of up to four different CPU operating speeds.

The invention has identification means 90 for sensing the state of the speed selection inputs 31, 32 and providing the sensed state as an input to a state machine 60. In FIG. 1, the identification means 90 for identifying the inputs to the clock generation means 23 consists of two conductors extending from the switches 31, 32 to the state machine 60. The state machine 60 is part of an interface between the synchronous bus 42 and a peripheral device 70 attached to the state machine 60 by a bus 80. This bus 80 consists of at least one device output operably connected to the speed dependent device or peripheral.

As shown in FIG. 1, the state machine 60 is designed to receive the speed selection inputs 31, 32. Logic means responsive to these inputs adjusts the operation of the state machine 60 so that the device 70 associated with this state machine 60 receives cycles of control signals and data as nearly optimum as possible for whatever CPU speed is selected. Optimum in this case means that where device 70 is an I/O device, the command time and the full cycle time for an I/O operation are maintained at or only slightly greater than the minimum times specified for the device.

The state machine 60 is used to control the peripheral device 70 because it is asynchronous and speed dependent. For example, the device 70 may be a typical hard disk drive with a command time of 120 microseconds and a cycle time of 280 microseconds. The state machine 60 provides a sequence of output signals with time intervals selected to match the command and cycle times of the device 70. The state machine 60 is shown separate from the chipset 50 in the preferred embodiment, but in fact it may be a part of the chipset.

Figure 2:
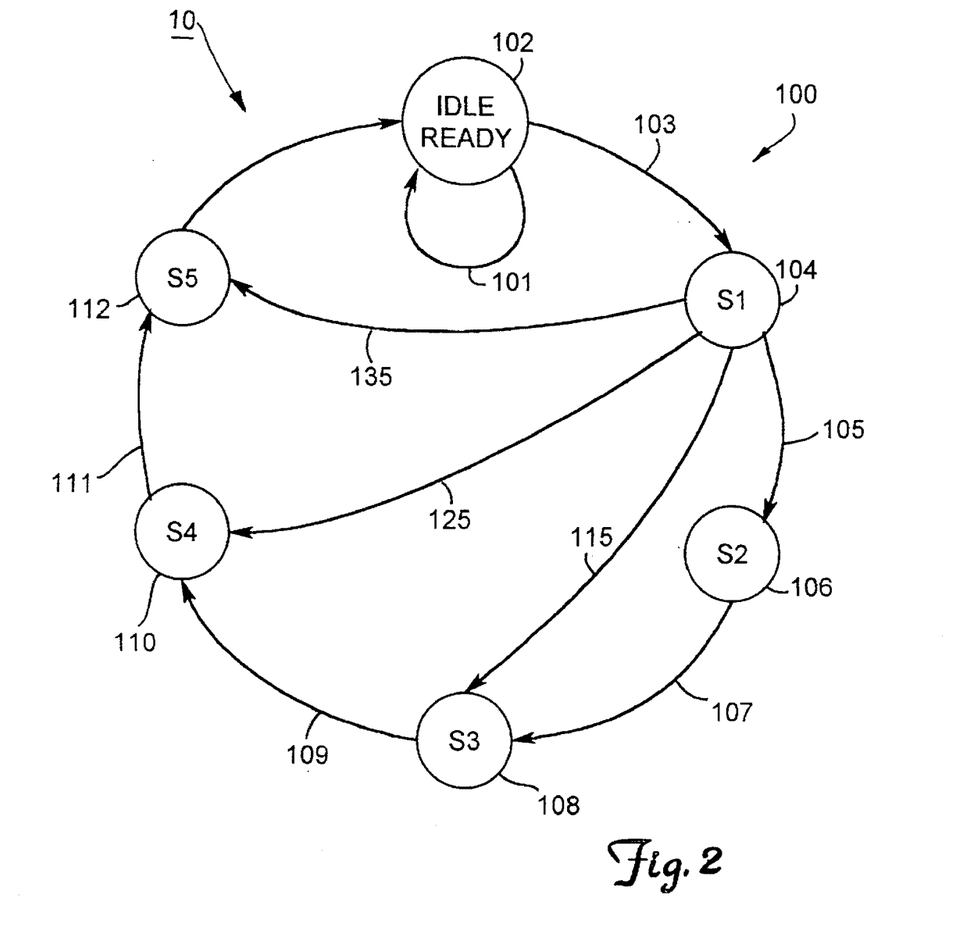
FIGS. 2 and 3 are state diagrams for a state machine used to implement the present invention.

The state machine 60 of the present invention is designed to permit adaptation to optimize its operation to the selected CPU speed. FIG. 2 shows a simplified state diagram of the state machine 60 that illustrates how it functions. By convention, the nodes indicate states. The arrows connecting one node to another (or circling back to the same node) indicate state transitions. Written beside the transition arrows is the signal or set of signals that cause the transition. (For a general description of state machines as realized in programmable logic, see PAL® Device Handbook by Advanced Micro Devices, p. 2-101 to 2-107 (Copyright 1988)).

The state machine 60 has an IDLE state 102 and five additional states S1–S5, labeled with reference numbers 104, 106, 108, 110 and 112. The available transitions of the state machine 60 are shown by the arrow 101 that links the IDLE state with itself and the arrows 103, 105, 107, 109, 111 that link the states S1–S5 in a clockwise circular fashion. The transitions of links 103, 105, 107, 109, 111 define a customary linear transition through a predefined sequence of states that define the normal steps of an operation of the memory or peripheral device 70. The state machine 60 receives a clock input corresponding to the clock signal on line 24. In FIG. 2, each clock signal causes a transition from one state to another (or from one state back to the same state).

Due to the timing requirements of the memory or peripheral device 70, some of the states S1–S5 are merely wait states in which the state machine 60 holds for one clock cycle while a time dependent operation occurs. If the state machine is designed to accommodate the highest CPU clock speed likely to be present, then it will have enough wait states to mark off the full necessary time-dependent interval, as defined by a number of clock cycles. The higher the frequency of the clock synthesizer chip 20, the shorter the interval is between clock signals. Defining a given time-dependent interval in the state machine 60 therefore requires a greater number of states when the clock frequency is higher than when it is lower. Thus, if the state diagram of FIG. 2 is to accommodate a higher clock speed, states S1–S5 must consume enough clock pulses to cover the amount of time required to execute an operation (i.e., the cycle time and the command time for the device 70). But if the state machine is set up to accommodate a higher clock speed and the clock speed is then decreased, the interval between clock signals correspondingly increases and the time required to pass through all the states defining the time-dependent intervals increases. This can result in unnecessarily slow operation of peripheral devices or memory.

To compensate for these changes in clock speed, the state machine 60 of the present invention defines additional transitions, 115, 125, 135 that lead from state S1 to states S3, S4 and S5, respectively. These additional transitions permit the state machine to use the inputs to the clock generation means 30 to adapt its state transitions to optimize the control of the attached peripheral(s). Transition 115 permits state S2 to be bypassed. Transition 125 permits states S2 and S3 to be bypassed. Transition 135 permits states S2, S3 and S4 to be bypassed. Thus, by using these transitions, the cycle from S1 to S5 can be shortened appropriately as the frequency selected is decreased.

To illustrate how the state machine 60 can adapt to differing CPU clock speeds, assume that the highest clock speed that the system is designed for is 32 megahertz and that the inputs to the clock generation means 30 and the clock synthesizer chip 20 will also permit lesser speeds of 24, 16 and 8 megahertz to be selected. Assume further that the peripheral device 70 requires $1/8$th of a microsecond to execute an operation. Thus, the interval between clock pulses is $1/32$nd of a microsecond at 32 megahertz, $1/24$th of a microsecond at 24 megahertz, $1/16$th of a microsecond at 16 megahertz and $1/8$th of a microsecond at 8 megahertz. To take full advantage of this range of clock speeds, the state machine 60 will have at least one device-dependent time interval that is defined by five states and the four transitions between them. In FIG. 2, such an interval is defined by states S1 through S5 (104, 106, 108, 110, 112) and the transitions 105, 107, 109, 111.

If the clock speed were decreased from 32 megahertz without change in the state machine 60, the duration of the interval defined by the states S1–S5 would increase from $4/32$nds of a microsecond, to $4/24$ths (at 24 megahertz), to $4/16$ths of a microsecond (at 16 megahertz), and to $4/8$ths of a microsecond at 8 megahertz. But with applicant's invention, the changes in clock speed can be sensed and the transitions in the state machine 60 can be changed in response thereto, to avoid the undesired and unnecessary lengthening of the time intervals controlled by the state machine 60. In particular, the "shortcut" transition paths 115, 125 and 135 can be used. The effect of using such a "shortcut" transition path on the total elapsed time to move from state S1 (104) to state S5 (112) can be seen in the following chart:

| Transition Path | Clock Speed | Clock Interval | Total Time (S1–S5) |
| --- | --- | --- | --- |
| 105, 107, 109, 111 | 32 MHz | $1/32$ μsec | $4/32 = 1/8$ μsec |
| 115, 109, 111 | 24 MHz | $1/24$ μsec | $3/24 = 1/8$ μsec |
| 125, 111 | 16 MHz | $1/16$ μsec | $2/16 = 1/8$ μsec |
| 135 | 8 MHz | $1/8$ μsec | $1/8$ μsec |

In the above example, it is possible to exactly offset each decrease in clock speed with a corresponding shortening of the transition path. Depending on the ratio between the various speeds that need to be accommodated and the length of the intervals defined by the state machine, such an exact offset may not be possible. But it will almost always be possible to "shortcut" one or more transition paths in the state machine and therefore to at least partially offset the increase in the time period necessary to cover a path involving multiple transitions when the clock speed is slowed down.

To illustrate, assume that in FIG. 1 CPU 40 again operates at 32 megahertz, 24 megahertz, 16 megahertz, and 8 megahertz. Further assume that in this case peripheral device 70 requires 1/12th of a microsecond to execute an operation. The state machine shown in FIG. 2 is also useful for this example, because it fairly closely matches the 1/12th of a microsecond required by peripheral device 70. But this state machine is not as efficient as the previous example, because a delay (at all CPU speeds) of 1/24th of a microsecond still remains for each peripheral operation. The following chart illustrates this inefficiency:

| Transition Path | Clock Speed, Interval | Total Time (S1–S5) | Time Needed by Device | Excess Device Time |
|---|---|---|---|---|
| 105, 107, 109, 111 | 32 MHz, 1/32 μs | 4/32 = 3/24 μs | 1/12 = 2/24 μs | 1/24 μs |
| 115, 109, 111 | 24 MHz, 1/24 μs | 3/24 = 3/24 μs | 1/12 = 2/24 μs | 1/24 μs |
| 125, 111 | 16 MHz, 1/16 μs | 2/16 = 3/24 μs | 1/12 = 2/24 μs | 1/24 μs |
| 135 | 8 MHz, 1/8 μs | 1/8 = 3/24 μs | 1/12 = 2/24 μs | 1/24 μs |

Figure 3:
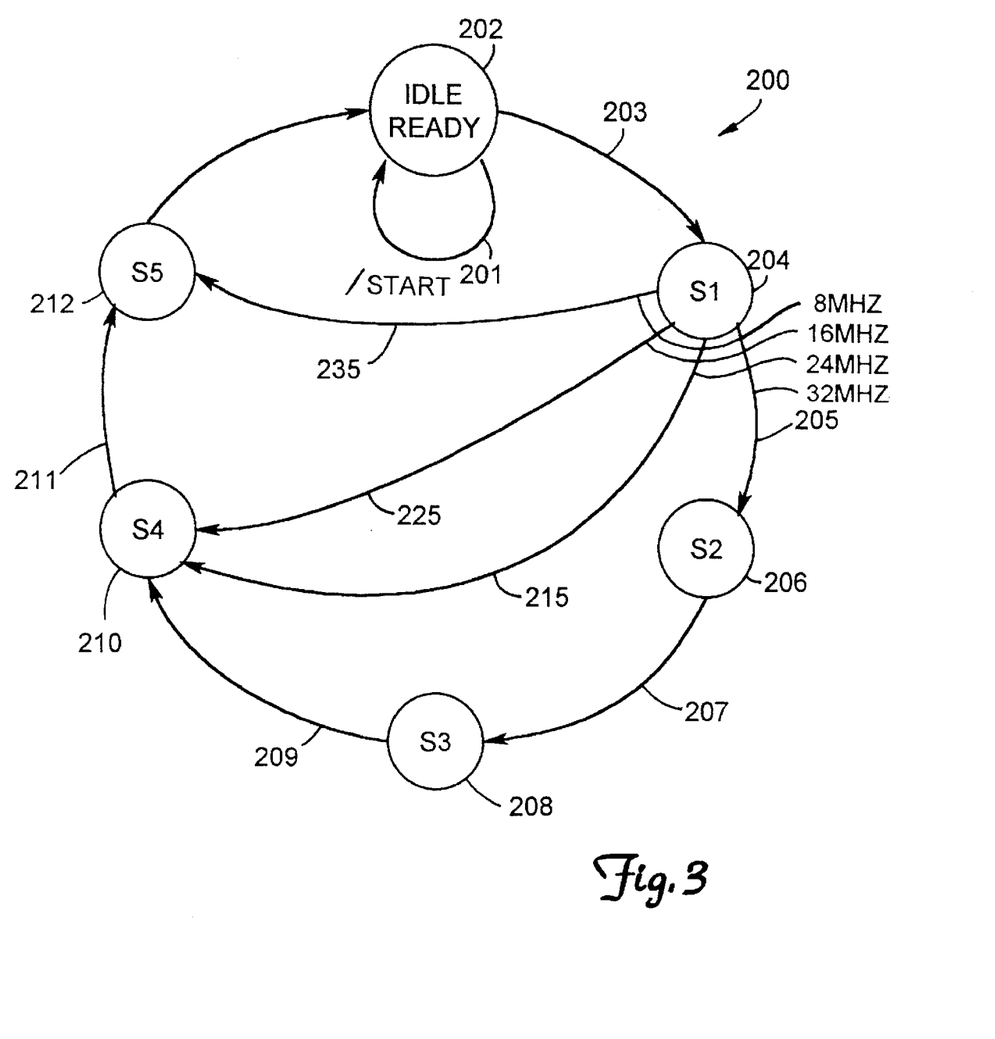

This inefficiency can be partially eliminated by a new state diagram, shown in FIG. 3, which uses two state transitions when a clock speed of 24 megahertz is selected. The transition path for 24 megahertz is 215, 211 in FIG. 3 instead of 115, 109, 111 as shown in FIG. 2. Elimination of one state transition reduces the total time by one clock interval. At 24 megahertz, each clock interval takes 1/24 of a microsecond, and two state transitions take 1/12 of a microsecond. This is exactly the time needed by the device, so there is no delay.

Figure 4:
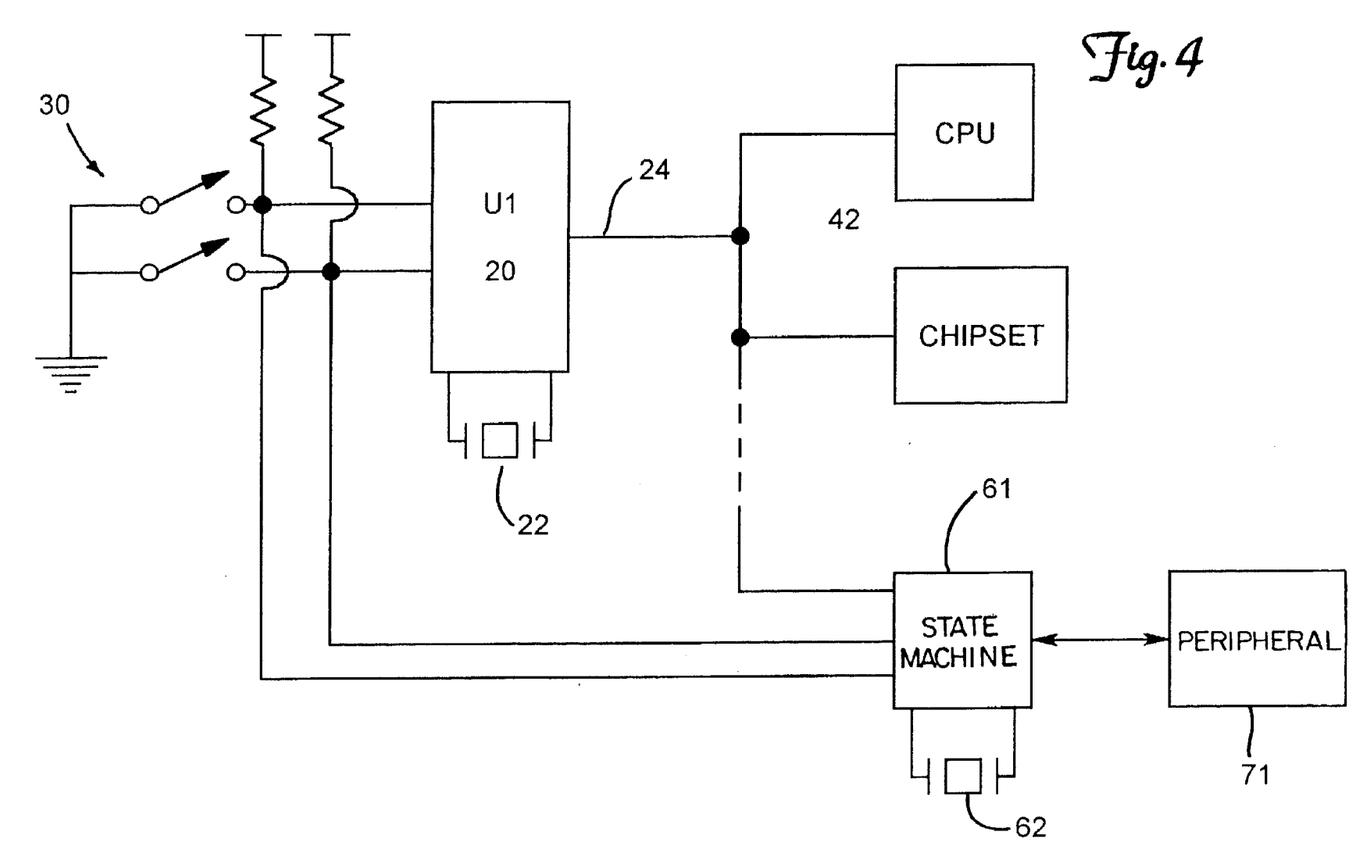
FIG. 4 is a schematic diagram of the present invention.

To eliminate the delay for all frequencies, it may be necessary to use a "fraction delay" device. FIG. 4 shows a state machine 61, and a fraction delay device 62 operating in conjunction with state machine 61. The fraction delay device is any device that issues a signal or pulse a fraction of a full clock interval after the delay device is activated. The fraction delay device 62 in FIG. 4 responds 1/64 of a microsecond after it is activated. Assume that in FIG. 3, Peripheral 71 requires 9/64 of a microsecond to execute each operation.

Figure 5:
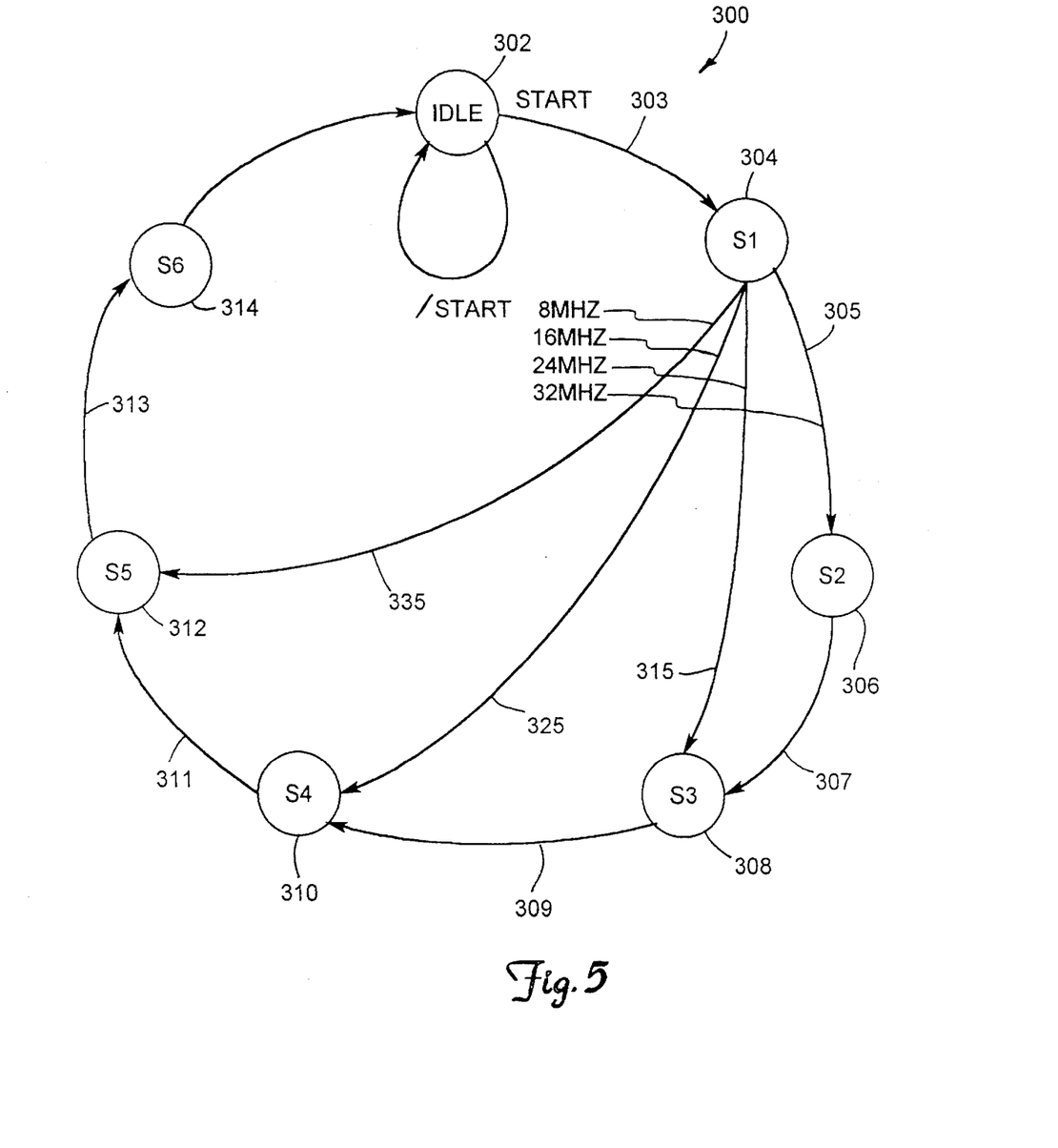
FIG. 5 is a state diagram for a state machine used to implement the present invention.

The state diagram of FIG. 5 relates to state machine 61. In this implementation, states S1 to S5 operate just as before, with state transitions occurring on each clock pulse.

| Transition Path | Clock Speed | Total Time (S1–S5) |
|---|---|---|
| 305, 307, 309, 311 | 32 MHz | 4/32 μs = 8/64 μs |
| 315, 309, 311 | 24 MHz | 3/24 μs = 8/64 μs |
| 325, 311 | 16 MHz | 2/16 μs = 8/64 μs |
| 335 | 8 MHz | 1/8 μs = 8/64 μs |

For each clock sped, only 8/64 of a microsecond is given to the peripheral device 71. The device 71 requires a full 9/64 of a microsecond, however, and one more clock pulse (regardless of clock speed) will give the device 71 more time than is needed. To eliminate the necessity of using a full clock interval, state transition 313 is shortened to a fraction of a clock interval. This is done by activating the fraction delay device when state S5 is reached. When the fraction delay device issues a signal 1/64 of a microsecond later, state transition 313 is made (S5 to S6). For the states S1 to S6, this procedure gives the peripheral device 9/64 of a microsecond, exactly the amount of time required.

Although the present invention has been shown and described with respect to preferred embodiments, various changes and modifications that are obvious to a person skilled in the art to which the invention pertains are deemed to lie within the spirit and scope of the invention as defined by the following claims.

What is claimed is:

1. An interface between a synchronous bus and an asynchronous bus operably connected to an asynchronous peripheral device in a system including a CPU, and a clock generator that generates a clock signal cycling at a frequency that is determined by speed settings, wherein the speed settings are inputs to the clock generator, and wherein the CPU is clocked by the clock signal, the interface comprising:

(a) a first input port that receives the clock signal;

(b) a second input port that receives the speed settings;

(c) means for communicating control signals to the asynchronous peripheral device;

(d) logic that evaluates the speed settings at the second input port to determine the frequency of the clock signal; and (e) a state machine that is responsive to the clock signal at the first input port and the speed settings at the second input port, and that controls the timing of control signals communicated to the asynchronous peripheral device, wherein the state machine traverses through a plurality of states during a time-dependent asynchronous peripheral device operation when the clock signal is oscillating at a first clock frequency, but bypasses at least one of the plurality of states during the same type of time-dependent asynchronous peripheral device operation when the clock signal is oscillating at a clock frequency that is lower than the first clock frequency, wherein the number of state transitions bypassed is determined by the speed settings.

2. The interface of claim 1, further comprising:

(f) a fraction delay device that introduces an additional, shortened state transition when it is activated.

3. The interface of claim 2 wherein the duration of the additional, shortened state transition introduced by the fraction delay device is less than a clock signal period.

4. The interface of claim 1, wherein the state machine is configured so that the time required to traverse through the state(s) at the lower clock frequency is equal to the time required to traverse through the plurality of states at the first clock frequency.

5. The interface of claim 1, wherein the state machine is configured so that the time required to traverse through the state(s) at the lower clock frequency is no less than the time required to traverse through the plurality of states at the first clock frequency.

6. A computer comprising:

(a) a clock generator that generates a clock signal cycling at a frequency that is determined by speed settings, wherein the speed settings are inputs to the clock generator;

(b) a CPU that receives the clock signal;

(c) a synchronous bus that is accessible by the CPU;

(d) an asynchronous peripheral device; and (e) an interface between the synchronous bus and the asynchronous bus operably connected to an asynchronous peripheral device, comprising:

a first input port that receives the clock signal, a second input port that receives the speed settings, means for communicating signals to the asynchronous peripheral device, logic that evaluates the speed settings at the second input port to determine the frequency of the clock signal, and a state machine that is responsive to the clock signal at the first input port and the speed settings at the second input port, and that controls the timing of signals communicated to the asynchronous peripheral device, wherein the state machine traverses through a plurality of states during a time-dependent asynchronous peripheral device operation when the clock signal is oscillating at a first clock frequency, but bypasses at least one of the plurality of states during the same type of time-dependent asynchronous peripheral device operation when the clock signal is oscillating at a clock frequency that is lower than the first clock frequency, wherein the number of state transitions bypassed is determined by the speed settings.

7. The computer of claim 6, further comprising:

(f) power saving mode circuitry that changes the speed settings to a slower speed when the computer is inactive for a predetermined period of time.

8. A computer comprising:

(a) clock speed switches that can be switched to a plurality of states;

(b) a clock generator comprising:

input ports for receiving the state of the clock speed switches, a 14 MHz crystal, and a clock synthesizer chip that uses the crystal to generate a clock signal cycling at a frequency that is determined by the state of the clock speed switches at the input ports;

(c) a microprocessor that receives the clock signal;

(d) a synchronous bus that is accessible by the CPU;

(e) an asynchronous peripheral device; and (f) an interface between the synchronous bus and the asynchronous bus operably connected to an asynchronous peripheral device, the interface comprising:

a first input port that receives the clock signal, a second input port for receiving the state of the clock speed switches, means for communicating control signals to the peripheral device, logic that evaluates the state of the clock speed switches at the second input port to determine the frequency of the clock signal, a state machine that is responsive to the clock signal at the first input port and the state of the clock speed switches at the second input port, and that controls the timing of the control signals communicated to the asynchronous peripheral device, wherein the state machine traverses through a plurality of states during a time-dependent asynchronous peripheral device operation when the clock signal is oscillating at a first clock frequency, but bypasses at least one of the plurality of states during the same type of time-dependent asynchronous peripheral device operation when the clock signal is oscillating at a clock frequency that is lower than the first clock frequency, wherein the number of state transitions bypassed is determined by the state of the clock speed switches, and a fraction delay device that introduces an additional, shortened state transition when it is activated.

9. A method of controlling the timing of signals communicated by an interface to a asynchronous peripheral device in a system that includes a CPU, and a clock generator generates a clock signal that oscillates at a frequency that is determined by speed settings, wherein the speed settings are inputs to the clock generator, and wherein both the CPU and the interface is clocked by the clock signal, the method comprising the steps of:

evaluating the speed settings to determine the frequency at which the clock signal is oscillating;

communicating control signals to the asynchronous peripheral device by traversing through a plurality of states in a state machine during a time-dependent asynchronous peripheral device operation when the system is oscillating at a first clock frequency; and communicating control signals from the interface to the asynchronous peripheral device by traversing through fewer states during the same type of time-dependent asynchronous peripheral device operation when the system oscillates at a clock frequency that is lower than the first clock frequency; and determining the number of states to traverse based on the speed settings evaluated.

10. The method of claim 9 further comprising the step of:

introducing an additional, shortened state transition when a fraction delay device is activated.

11. The method of claim 10 wherein the duration of the additional, shortened state is less than the clock signal period.

12. The computer of claim 6, further comprising:

(f) a fraction delay device that introduces an additional shortened state transition when it is activated.

13. The computer of claim 6, wherein the duration of the additional shortened state transition introduced by the fraction delay device is less than a clock signal period.

* * * * *

UNITED STATES PATENT AND TRADEMARK OFFICE
CERTIFICATE OF CORRECTION

Page 1 of 2

PATENT NO.   : 5,657,482
DATED        : August 12, 1997
INVENTOR(S)  : Dean A. Klein It is certified that error appears in the above-identified patent and that said Letters Patent is hereby corrected as shown below:

| Column | Line | Reads  | Should Read |
|--------|------|--------|-------------|
| 1      | 63   | dock   | clock       |
| 1      | 65   | dock   | clock       |
| 2      | 13   | dock   | clock       |
| 2      | 14   | dock   | clock       |
| 3      | 51   | dock   | clock       |
| 3      | 62   | dock   | clock       |
| 3      | 64   | dock   | clock       |
| 4      | 1    | dock   | clock       |
| 4      | 4    | dock   | clock       |
| 4      | 34   | dock   | clock       |
| 4      | 46   | dock   | clock       |
| 5      | 11   | dosely | closely     |
| 5      | 30   | dock   | clock       |
| 5      | 33   | dock   | clock       |
| 5      | 34   | dock   | clock       |

UNITED STATES PATENT AND TRADEMARK OFFICE
CERTIFICATE OF CORRECTION

PATENT NO. : 5,657,482
DATED : August 12, 1997
INVENTOR(S) : Dean A. Klein

It is certified that error appears in the above-identified patent and that said Letters Patent is hereby corrected as shown below:

| Column | Line | Reads | Should Read |
|--------|------|-------|-------------|
| 5 | 50 | dock | clock |
| 5 | 54 | sped | speed |
| 5 | 64 | dock | clock |
| 6 | 17 | docked | clocked |

Signed and Sealed this

Third Day of February, 1998

BRUCE LEHMAN

Attest:

Attesting Officer

Commissioner of Patents and Trademarks